United States Patent [19]

Straub

[11] Patent Number: 5,322,536
[45] Date of Patent: Jun. 21, 1994

[54] FILTER APPARATUS

[76] Inventor: Hartwig Straub, Gansäckerstrasse, 74744 Ahorn-Beroizheim, Fed. Rep. of Germany

[21] Appl. No.: 102,826

[22] Filed: Aug. 6, 1993

[30] Foreign Application Priority Data

Aug. 6, 1992 [DE] Fed. Rep. of Germany ... 9210545[U]

[51] Int. Cl.$^5$ .......................................... B01D 46/02
[52] U.S. Cl. ........................................ 55/483; 55/489; 55/493; 55/498; 55/529
[58] Field of Search ............... 55/483, 486–489, 55/493, 497, 498, 506, 529

[56] References Cited

U.S. PATENT DOCUMENTS

| | | | |
|---|---|---|---|
| 4,014,796 | 3/1977 | Sugiyama et al. | 55/529 X |
| 4,655,806 | 4/1987 | Krantz | 55/302 X |
| 4,689,059 | 8/1987 | Magdelair | 55/529 X |
| 4,890,444 | 1/1990 | vander Giessen et al. | 55/498 |

*Primary Examiner*—Charles Hart
*Attorney, Agent, or Firm*—Banner, Birch, McKie & Beckett

[57] ABSTRACT

Filter apparatus with a filter cartridge disposed in a compression-proof and pressure-sealed housing. The housing for the filter cartridge comprises two tubular cylinders, each of which having at least one opening of the same size, where both cylinders touch in such a manner that the inner surface of the outer of the two cylinders rests against the outer surface of the inner cylinder, and the inner cylinder envelops the filter cartridge, and that the outer of the two cylinders can be rotated in such a manner around the inner cylinder around a common axis of rotation that the opening of the inner cylinder can be brought coincidence with the opening of the outer cylinder.

13 Claims, 2 Drawing Sheets

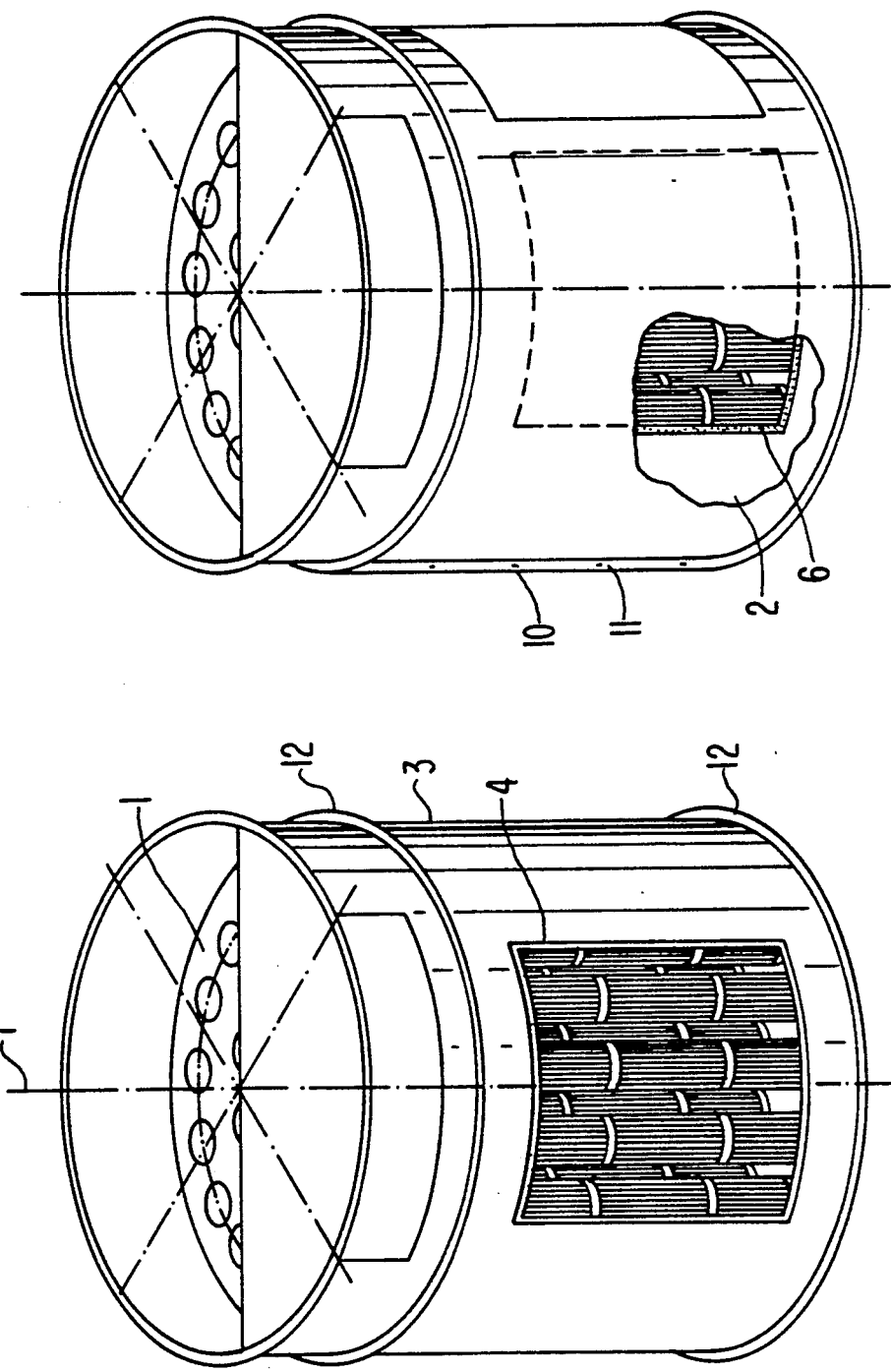

FILTER APPARATUS

The invention relates to a compression-proof and pressure-sealed filter apparatus with a housing that enables an opening that is technologically simple for maintenance and repair purposes.

When filtering dust-shaped particles from gaseous mediums, a universally known model of cylindrically shaped filter cartridges is used that often comprise several rod-shaped filter elements. These filter cartridges have to be accessible for maintenance and repair purposes.

To date this accessibility has been achieved by means of a relatively complicated design by cutting into the inner cylinder an opening that was provided with a cover. This cover, which can be screwed to the outer edge and can be removed, is expensive with respect to technology and material and requires, moreover, for opening and closing tools for whose manipulation there is often not enough space. Furthermore, it is known that the accessibility can be achieved with flat doors, which can be pivoted in hinges.

The invention is based on the problem of designing in such a manner a filter apparatus of the kind that is assumed to be known that the filter apparatus can be opened rapidly with low technical complexity and low cost in material.

This problem is solved according to the invention by the features specified in claim 1.

Correspondingly a division of the cylinder wall of the filter apparatus that is provided with a cover and was designed to date as one piece with an opening is designed as two pieces. At the same time the cylinder wall comprises two tubular cylinders 2, 3, each of which exhibiting at least one opening 4a, 4b of the same size, where both cylinders touch in such a manner that the inner surface of the outer of the two cylinders 3 rests against the outer surface of the inner cylinder 2, and the inner cylinder 2 envelops the filter cartridge 1. Each of the two cylinders which can be rotated in opposite directions around a common axis of rotation 7 has an equally large and identically shaped opening in the cylinder wall, which when suitably rotated are brought coincidence, in order to achieve in this manner an accessibility of the filter interior. In order to close the openings in the cylinder walls, said closing being necessary for normal filtering operations, the outer cylinder 2 is rotated so far relative to the inner cylinder 3 that the outer cylinder totally covers the opening of the inner cylinder.

An especially preferred embodiment of the outer cylinder 3 is the subject matter of claim 11. Thus, the outer cylinder has about 180° with respect to the opening 4b a slot, which extends parallel to the axis of rotation 7 of both cylinders perpendicularly to the cylinder faces from top to bottom in the linear direction of the jacket. The shape of this slot 9 is conical; and both edges have along the entire length of the slot a fold 8 that is bent over outwardly. A clamping strip 5 designed as a counterpart to the folds 8 and exhibiting the same conicity as the slot, whose height matches that of the outer cylinder 3, has on its lateral longitudinal edges folds 8 that are bent inwardly. By sliding the clamping strip 5 on the outer cylinder 3 the outer cylinder is stretched around the inner cylinder. This clamping mechanism is operated, when the outer cylinder 3 totally covers the opening of the inner cylinder 4a with its wall, in order to obtain a pressure-sealed closing of the filter housing of the filter apparatus. By opening the clamping mechanism the outer cylinder can be rotated again in such a manner relative to the inner cylinder that both openings 4a and 4b can be brought coincidence, in order to be able to obtain thus accessibility for maintenance and repair purposes. When tensioning the outer cylinder 3 with respect to the inner cylinder 2 an interconnection of both housing cylinders is obtained. When the elasticity of the strip material of the outer cylinder 3 is adequately high, an assembly can also be implemented on the side around the inner cylinder 2. To achieve a pressure seal in the clamped state and to prevent filtrate from entering between inner 2 and outer cylinder 3, a strip-shaped seal 6 is attached to the outside of the inner cylinder 2 of the housing around the entire opening 4a on the cylinder jacket.

Expedient improvements of the apparatus according to the invention follow from claims 1 to 12. In the following the invention is explained in detail with reference to the preferred embodiments shown in the drawings.

FIG. 1 depicts an assembled filter apparatus in the open state.

FIG. 2 depicts an assembled filter apparatus in the closed state.

Figure 3:
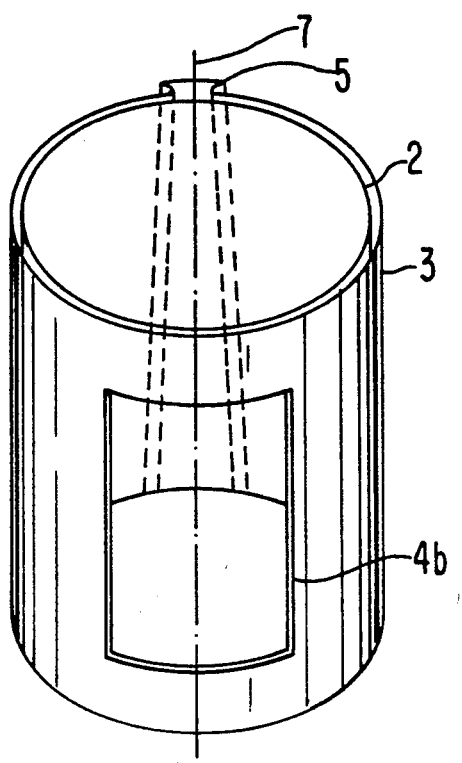
FIG. 3 depicts the double cylinder housing in the open state.
Figure 4:
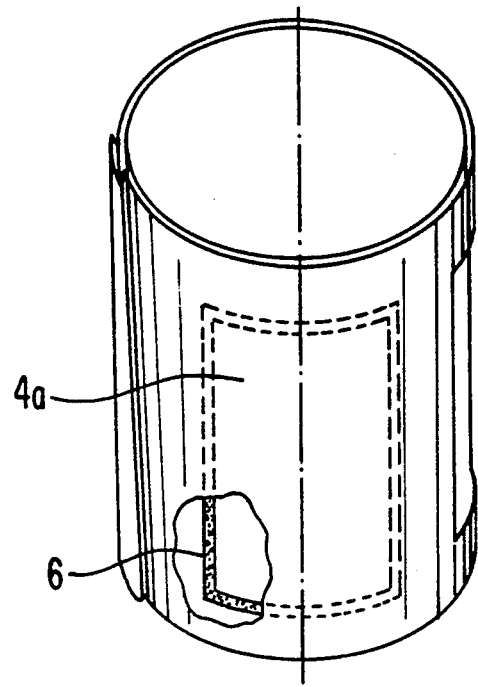
FIG. 4 depicts the double cylinder housing in the closed state.
Figure 5:
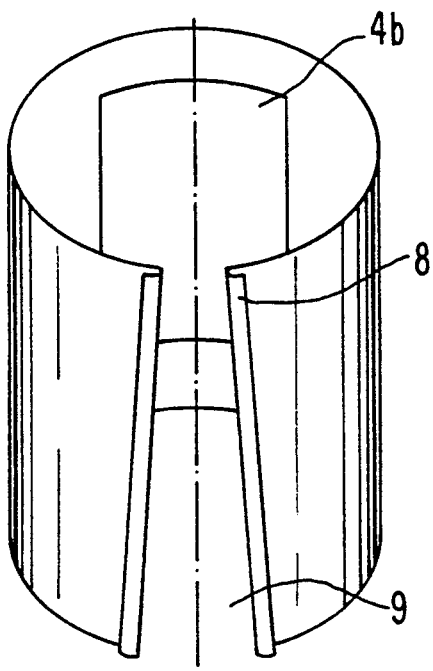
FIG. 5 depicts the outer cylinder in the unclamped state.
Figure 6:
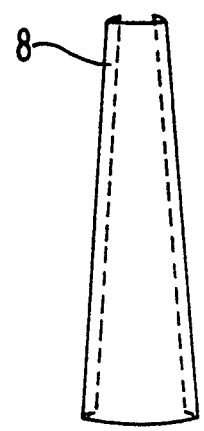
FIG. 6 depicts the clamping strip.

The filter apparatus comprises two tubular cylinders—an outer 3 and inner cylinder 2—enclosing a filter cartridge 1, where the outer 3 of the two cylinders can be rotated around the inner cylinder 2 around a common axis of rotation 7. Each of the two cylinders 2,3 is provided with at least one angular opening 4a, 4b, whose size and shape is identical; by rotating said openings they can be brought coincidence for the purpose of maintenance and repair jobs. The openings 4a, 4b of the outer 3 and the inner cylinder 2 have in the arrangement of each opening a width of 1/7 to $\frac{1}{4}$, preferably 1/6 of the respective cylinder circumference and a height of $\frac{5}{8}$ to $\frac{7}{8}$, preferably $\frac{3}{4}$ of the respective cylinder height, where the bridge heights at the upper and the lower edge are identical. The outer cylinder 3 has in the arrangement of an opening a clamping strip 5, which is arranged detachably by approx. 180° relative to the opening 4b and extends parallel to the axis of rotation 7 perpendicularly to the cylinder faces from the upper to the bottom front edge and running in the linear direction of the jacket. By clamping the outer cylinder 3 around the inner cylinder 2 and providing a strip-shaped seal 6, which is situated around the outside of the opening 4a of the inner cylinder 2, when the outer cylinder 3 is rotated in such a manner that its jacket totally covers the opening 4a of the inner cylinder 2, a housing of the filter apparatus that is pressure sealed up to pressures of about 1 MPa is guaranteed.

The faces of the inner cylinder 2 can have a fold-like edge 12 extending over the outer diameter, so that the outer cylinder 3 is ensured against axial displacement.

When arranging an opening approx. 180° relative to the opening 4b the outer cylinder 3 is slotted conically in the direction of the cylinder jacket, and both side edges of the slot are bent inwardly as folds 8. The actual clamping strip 5, whose sides have the same conicity as the slot 9, are provided as a counterpart to the slot 9. Reaching into the fold, this clamping strip 5 is slid in such a manner over the slot 9 of the outer cylinder 3 that, when the faces of the clamping strip 5 close evenly with the faces of the outer cylinder 3, a tangential clamping effect to the outer cylinder 3 is produced around the inner cylinder 2, which in interaction with the sealing strip 6, attached preferably around the opening 4a, guarantees that the filter apparatus is pressure sealed up to a pressure of about 1 MPa. Any arbitrary clamping mechanism that is typically used for this purpose is also possible as e.g. the use of several clamps, clamping bands laid around the cylinder, etc.

Another similar embodiment has a folding strip 11, which is provided, instead of the described clamping mechanism, at the slot 9 of the outer cylinder 3 on both sides and is provided with holes 10 for screwing together and which acts as the clamping mechanism and makes it possible, on the one hand to rotate the outer cylinder 3 after loosening the screw connections and, on the other hand, to clamp and seal the filter housing, on the one hand, after tightening the screw connections.

In the above, embodiments were explained in which the opening was opposite the slot. However, an arrangement in which the outer cylinder is slotted in the center of the opening along a line of the jacket has also been demonstrated to be advantageous. The clamping mechanism that clamps the edges together tangentially, is then above and below the opening in the slotted segments.

I claim:

1. Filter apparatus with a filter cartridge disposed in a compression-proof and pressure-sealed housing, wherein the housing for the filter cartridge (1) comprises two tubular cylinders (2, 3), each of which exhibiting at least one opening (4a, 4b) of the same size, where both cylinders touch in such a manner that the inner surface of the outer of the two cylinders (3) rests against the outer surface of the inner cylinder (2), and the inner cylinder (2) envelops the filter cartridge (1), and wherein the outer of the two cylinders (3) can be rotated in such a manner around the inner cylinder (2) around a common axis of rotation (7) that the opening (4a) of the inner cylinder (2) can be brought coincidence with the opening (4b) of the outer cylinder (3).

2. Filter apparatus, as claimed in claim 1, wherein the outer cylinder (3) is made of thin, flexible strip material.

3. Filter apparatus, as claimed in claim 1 or 2, wherein the material of the outer cylinder (3) is metal.

4. Filter apparatus, as claimed in claim 1, wherein the openings (4a, 4b) in both the inner cylinder (2) and the outer cylinder (3) have essentially the same size and shape.

5. Filter apparatus, as claimed in claim 1, wherein in the arrangement of each opening the openings (4a, 4b) of the outer (3) and the inner cylinder (2) have a width of 1/7 to ¼, preferably 1/6 of the respective cylinder circumference and a height of ⅜ to ¾, preferably ¾ of the respective cylinder height, where the bridge width is identical at the upper and the lower edge.

6. Filter apparatus, as claimed in claim 1, wherein the openings (4a, 4b) of the outer (3) and inner cylinder (2) have a round shape.

7. Filter apparatus, as claimed in claim 1, wherein the openings (4a, 4b) of the outer (3) and inner cylinder (2) have an angular shape, preferably a rectangular shape.

8. Filter apparatus, as claimed in claim 7, wherein the corners of the openings (4a, 4b) of the outer (3) and inner cylinder (2) are rounded off.

9. Filter apparatus, as claimed in claim 1, wherein a strip-shaped seal (6) is attached to the outside of the inner cylinder (2) of the housing around the entire opening (4a) on the cylinder jacket.

10. Filter apparatus, as claimed in claim 1, wherein a strip-shaped seal (6) is attached to the inside of the outer cylinder (3) around the entire opening (4b) on the cylinder jacket.

11. Filter apparatus, as claimed in claim 1, wherein when arranging an opening with respect to the opening (4b), the outer cylinder (3) is slotted along the line of the jacket, and wherein the resulting edges can be clamped together tangentially by means of a clamping mechanism.

12. Filter apparatus, as claimed in claim 11, wherein the width of the slot increases from one face of the cylinder to the other, and both edges along the entire length of the slot are bent outwardly as a fold (8), and wherein there is a clamping strip (5), which is designed as a counterpart to the fold (8) and exhibits the same conicity as the slot and whose height corresponds to that of the outer cylinder (3) and whose edges have the fold (8) bent inwardly.

13. Filter apparatus, as claimed in claim 1, wherein in the arrangement of an opening the outer cylinder (3) is slotted in the middle of the opening (4b) along a line of the jacket, and wherein the resulting edges can be clamped together tangentially by means of a clamping mechanism.

* * * * *